(12) United States Patent
John Wilson et al.

(10) Patent No.: US 11,082,105 B2
(45) Date of Patent: Aug. 3, 2021

(54) RLM MONITORING USING SIGNALED DYNAMIC PARAMETER

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Sumeeth Nagaraja, San Diego, CA (US); Heechoon Lee, San Diego, CA (US); Xiaoxia Zhang, San Diego, CA (US); Xiao feng Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 18 days.

(21) Appl. No.: 15/895,839

(22) Filed: Feb. 13, 2018

(65) Prior Publication Data
US 2018/0269950 A1    Sep. 20, 2018

Related U.S. Application Data

(60) Provisional application No. 62/473,238, filed on Mar. 17, 2017.

(51) Int. Cl.
*H04W 24/10*    (2009.01)
*H04B 7/06*    (2006.01)
(Continued)

(52) U.S. Cl.
CPC ......... *H04B 7/0626* (2013.01); *H04B 7/0617* (2013.01); *H04B 17/21* (2015.01);
(Continued)

(58) Field of Classification Search
CPC ..... H04W 24/00; H04W 24/10; H04W 76/27; H04W 24/08; H04L 43/50; H04L 43/0852;
(Continued)

(56) References Cited

U.S. PATENT DOCUMENTS 8,780,766 B2    7/2014    Chen et al.
8,995,366 B2    3/2015    Nimbalker et al.
(Continued)

FOREIGN PATENT DOCUMENTS

CN    103200684 A    7/2013
CN    106465169 A    2/2017
(Continued)

OTHER PUBLICATIONS

Ericsson, "Remaining details of beam recovery", 3GPP Draft; R1-1720737 Remaining Details of Beam Recovery, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 18, 2017 (Nov. 18, 2017), XP051370194, 10 pages, Retrieved from the Internet: www.3gpp.org [retrieved on Nov. 18, 2017].
(Continued)

*Primary Examiner* — Hassan A Phillips
*Assistant Examiner* — Prenell P Jones
(74) *Attorney, Agent, or Firm* — Arent Fox, LLP

(57) ABSTRACT

In order to provide a more robust RLM procedure for 5G/NR, a base station may provide a dynamic relationship between a PDCCH and another reference signal (e.g., SS/CSI-RS) to a UE. For example, an apparatus may receive an adjustment parameter regarding a PDCCH from a base station. The adjustment parameter may comprise a relationship between the PDCCH and the at least one of the SS or the CSI-RS for deriving a radio link quality of a hypothetical
(Continued)

PDCCH. The apparatus may receive an SS/CSI-RS that is QCL with the PDCCH and perform a radio link measurement based on the received at least one of the SS or the CSI-RS using the adjustment parameter regarding the PDCCH. Among other relationships/offsets, the adjustment parameter may indicate a TPR difference, a beamforming gain difference, a beam width difference, a beam orientation difference.

31 Claims, 14 Drawing Sheets

(51) Int. Cl.
  H04L 25/02    (2006.01)
  H04B 17/21    (2015.01)
  H04L 5/00     (2006.01)
  H04B 17/309   (2015.01)
  H04W 76/27    (2018.01)
  H04W 24/08    (2009.01)

(52) U.S. Cl.
  CPC ......... H04B 17/309 (2015.01); H04L 5/0053 (2013.01); H04L 25/0224 (2013.01); H04W 24/10 (2013.01); *H04L 5/005* (2013.01); *H04L 5/0051* (2013.01); *H04W 24/08* (2013.01); *H04W 76/27* (2018.02)

(58) Field of Classification Search
  CPC ... H04L 43/08; H04L 25/0224; H04L 5/0053; H04L 5/005; H04L 5/0051; H04B 17/003; H04B 7/0626; H04B 7/0617; H04B 17/21; H04B 17/309
  See application file for complete search history.

(56) References Cited

U.S. PATENT DOCUMENTS

| | | | |
|---|---|---|---|
| 9,198,070 B2 | 11/2015 | Krishnamurthy et al. | |
| 9,203,576 B2 | 12/2015 | Frenne et al. | |
| 9,380,571 B2* | 6/2016 | Park | H04B 7/0473 |
| 9,648,603 B2 | 5/2017 | Lee et al. | |
| 2015/0358144 A1 | 12/2015 | Fleischer et al. | |
| 2016/0014758 A1 | 1/2016 | Lee et al. | |
| 2016/0112099 A1* | 4/2016 | Lee | H04B 7/0413 370/252 |
| 2016/0262161 A1* | 9/2016 | Li | H04L 5/0051 |
| 2016/0360452 A1* | 12/2016 | Koorapaty | H04J 11/0069 |
| 2017/0078066 A1* | 3/2017 | Park | H04L 5/0048 |
| 2017/0086153 A1* | 3/2017 | Yoon | H04L 27/2675 |
| 2017/0093558 A1* | 3/2017 | Ramezani | H04L 7/0029 |
| 2017/0150384 A1* | 5/2017 | Rune | H04W 36/0088 |
| 2017/0171842 A1* | 6/2017 | You | H04L 5/0048 |
| 2017/0230994 A1* | 8/2017 | You | H04L 5/0053 |
| 2018/0084572 A1* | 3/2018 | You | H04W 72/0446 |
| 2018/0110057 A1* | 4/2018 | Park | H04W 72/12 |
| 2018/0115357 A1* | 4/2018 | Park | H04B 7/04 |
| 2018/0184344 A1* | 6/2018 | Periyasamy | H04L 43/16 |
| 2018/0227156 A1* | 8/2018 | Papasakellariou | H04W 72/0453 |
| 2019/0081688 A1* | 3/2019 | Deenoo | H04B 7/088 |
| 2019/0215119 A1* | 7/2019 | Kim | H04L 5/005 |
| 2019/0229879 A1* | 7/2019 | Yi | H04L 5/0082 |
| 2019/0289582 A1* | 9/2019 | Seo | H04L 27/2613 |
| 2019/0319686 A1* | 10/2019 | Chen, IV | H04B 7/0639 |
| 2019/0319833 A1* | 10/2019 | Nagaraja | H04B 7/0695 |
| 2020/0021474 A1* | 1/2020 | Papasakellariou | H04W 74/006 |
| 2020/0260430 A1* | 8/2020 | Grant | H04B 7/0695 |
| 2020/0288479 A1* | 9/2020 | Xi | H04B 7/02 |

FOREIGN PATENT DOCUMENTS

| | | |
|---|---|---|
| EP | 3139658 A1 | 3/2017 |
| GB | 2507570 A | 5/2014 |
| WO | 2012024320 A1 | 2/2012 |
| WO | 2014068535 A2 | 5/2014 |
| WO | 2014193070 A1 | 12/2014 |
| WO | 2016021880 A1 | 2/2016 |
| WO | 2016163645 A1 | 10/2016 |
| WO | 2016163842 A1 | 10/2016 |

OTHER PUBLICATIONS

International Search Report and Written Opinion—PCT/US2018/018221—ISA/EPO—dated May 17, 2018.

* cited by examiner

RLM MONITORING USING SIGNALED DYNAMIC PARAMETER

CROSS-REFERENCE TO RELATED APPLICATION

This application claims the benefit of U.S. Provisional Application Ser. No. 62/473,238, entitled "RLM Monitoring Using Signaled Dynamic Parameter" and filed on Mar. 17, 2017, which is expressly incorporated by reference herein in its entirety.

BACKGROUND

Field

The present disclosure relates generally to communication systems, and more particularly, to a radio link monitoring.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Radio Link Monitoring (RLM) may be an important procedure to track radio link conditions in 5G/NR. The RLM procedure may indicate whether the air link is in-sync or out-of-sync, e.g., "out-of-sync" indicating that the radio link condition is poor and "in-sync" indicating that the radio link condition is acceptable and the UE is likely to receive a PDCCH transmitted on the radio link. There is a need for a more robust RLF procedure for 5G/NR.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

There is a need for a more robust RLM procedure for 5G/NR. For example, in 5G/NR an RLM procedure may be performed to infer a radio link quality for a hypothetical PDCCH based on measurements for a different, quasi-co-located (QCL) reference signal using static parameters. For example, in 5G/NR, a PDCCH may be transmitted over a beam using port(s) that is quasi-co-located (QCL) with a reference signal port set, e.g., a signaled synchronization signal (SS) port set or a Channel State Information Reference Signal (CSI-RS) port set. Thus, the UE may use measurements for the SS/CSI-RS to infer a signal quality for a channel over which PDCCH is transmitted by observing the channel over which the SS/CSI-RS port set is transmitted. The UE may be able to infer parameters of the channel (such as delay spread, Doppler, etc.) over which PDCCH is transmitted, by observing the channel over which SS port set is transmitted. The UE might also be able to infer spatial parameters of the PDCCH beam from the SS beam. The PDCCH beam might be very similar to the SS/CSI-RS beam, at times, there may be differences from the SS/CSI-RS beam. Thus, at times, the inferred radio link quality may not be accurate for the PDCCH. For example, even though a base station might be able to power boost the PDCCH, the UE may declare a radio link failure (RLF) based on an out-of-sync determination using static parameters and measurements of the other reference signal.

A more robust solution may be provided by having the network signal dynamic parameters to the UE to assist the UE in making a more accurate in-sync/out-of-sync determination in connection with RLM for 5G/NR. For example, the base station may signal any of a number of adjustment parameters to the UE regarding an offset or difference in parameters between the reference signal and the PDCCH. The adjustment parameter may comprise a dynamic adjustment parameter. Among others, examples of such adjustment parameters may correspond to any of a traffic to pilot ratio (TPR) of a hypothetical PDCCH in relation to a TPR of the reference signal, beam relations between the reference signal used for a radio link quality determination and a PDCCH beam, beamforming gain differences of a hypothetical PDCCH, beam width differences of a hypothetical PDCCH and the reference signal, beam orientation differences of a hypothetical PDCCH and the reference signal, etc. The adjustment parameter for the hypothetical PDCCH may be indicated with respect to a reference signal that the UE uses to perform RIM in order to derive a radio link quality for the hypothetical PDCCH. The UE may then use this information regarding the dynamic parameters to derive a more accurate quality determination for the link leading to better performance.

In an aspect of the disclosure, a method, a computer-readable medium, and an apparatus are provided. The apparatus receives an adjustment parameter regarding a PDCCH from a base station. The adjustment parameter comprises a relationship between the PDCCH beam and the at least one of the SS or the CSI-RS beam for deriving a radio link quality. The apparatus receives an SS/CSI-RS over SS/CSI-RS ports that are QCL with the ports transmitting the PDCCH and performs a radio link measurement based on the received at least one of the SS or the CSI-RS using the adjustment parameter regarding the PDCCH. Among other relationships, the adjustment parameter may indicate a TPR difference, a beamforming gain difference, a beam width difference, a beam orientation difference. When a derived radio link quality for the PDCCH is below a desired level, the apparatus may perform at least one of a PDCCH beam recovery procedure and an radio link failure procedure.

In another aspect of the disclosure, a method, a computer-readable medium, and an apparatus are provided. The apparatus transmits an adjustment parameter to a UE regarding a PDCCH from the base station. The apparatus transmits, to the UE, at least one of an SS and a CSI-RS transmitted over SS/CSI-RS ports that are QCL with the port transmitting the PDCCH. The adjustment parameter comprises a relationship between the PDCCH and the at least one of the SS or the CSI-RS for deriving a radio link quality at the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
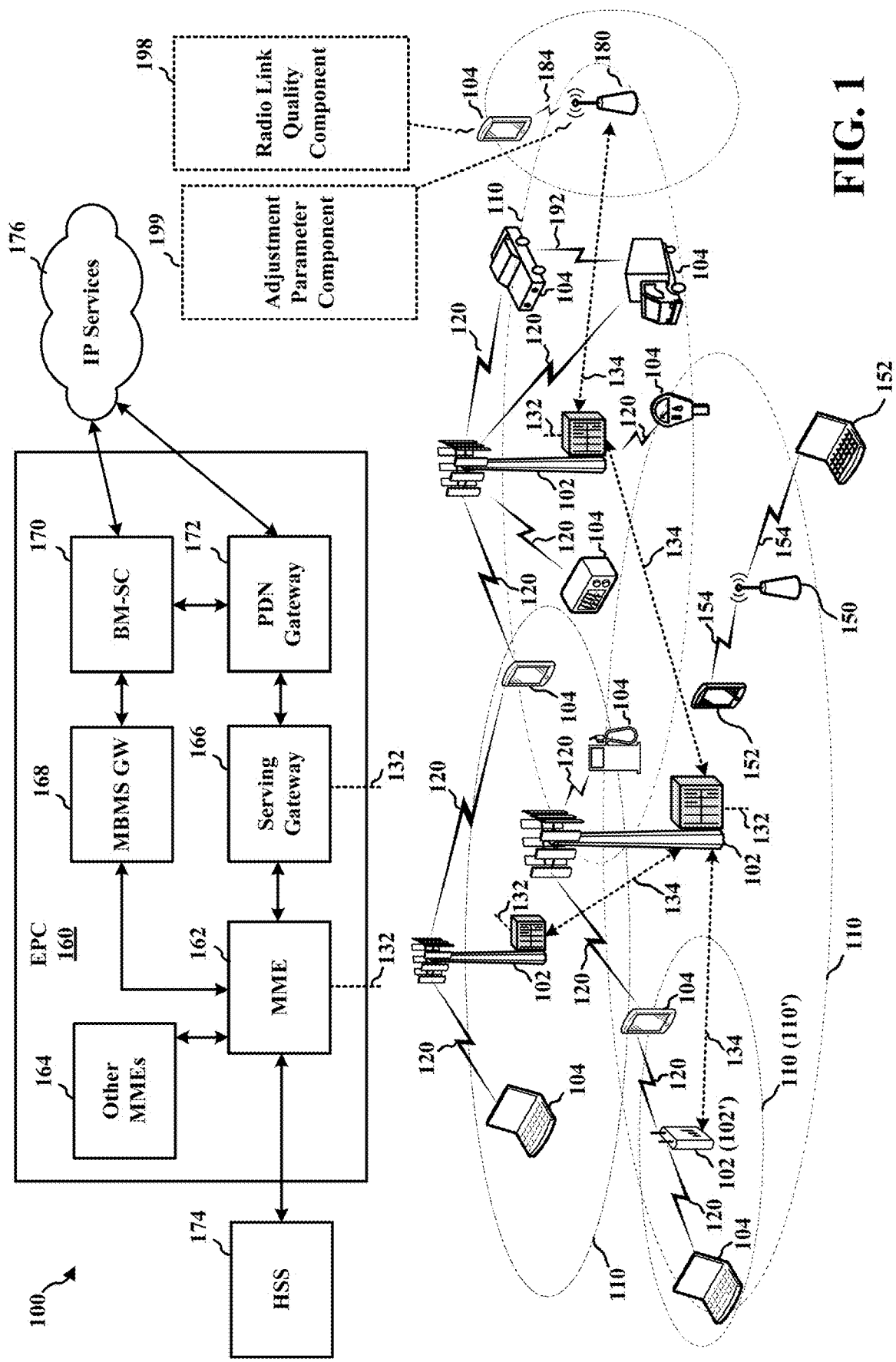
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ 5G/NR and use the same 5 GHz unlicensed frequency spectrum as used by the Wi-Fi AP 150. The small cell 102', employing 5G/NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured with an radio link quality component 198, e.g., which may correspond to radio link quality component 1014 in apparatus 1014. The radio link quality component 198 may be configured to derive an air link quality for a hypothetical PDCCH from a base station using a dynamic parameter signaled to the UE and based on measurements of an SS/CSI-RS received over SS/CSI-RS ports that are QCL with the port transmitting the PDCCH. The dynamic parameter may comprise a relationship between the PDCCH and the at least one of the SS or the CSI-RS for deriving a radio link quality of the PDCCH using the SS/CSI-RS. Among other relationships, the dynamic parameter may indicate a TPR difference, a beamforming gain difference, a beam width difference, a beam orientation difference. Similarly, base station 180, 102 may include an adjustment parameter component 199 configured to indicate an adjustment parameter regarding an offset/difference between a PDCCH and an SS/CSI-RS to the UE for use in deriving an RLM for the PDCCH based on measurements of the SS/CSI-RS, e.g., as described in connection with FIGS. 6-8 and 12-14.

Figure 2:
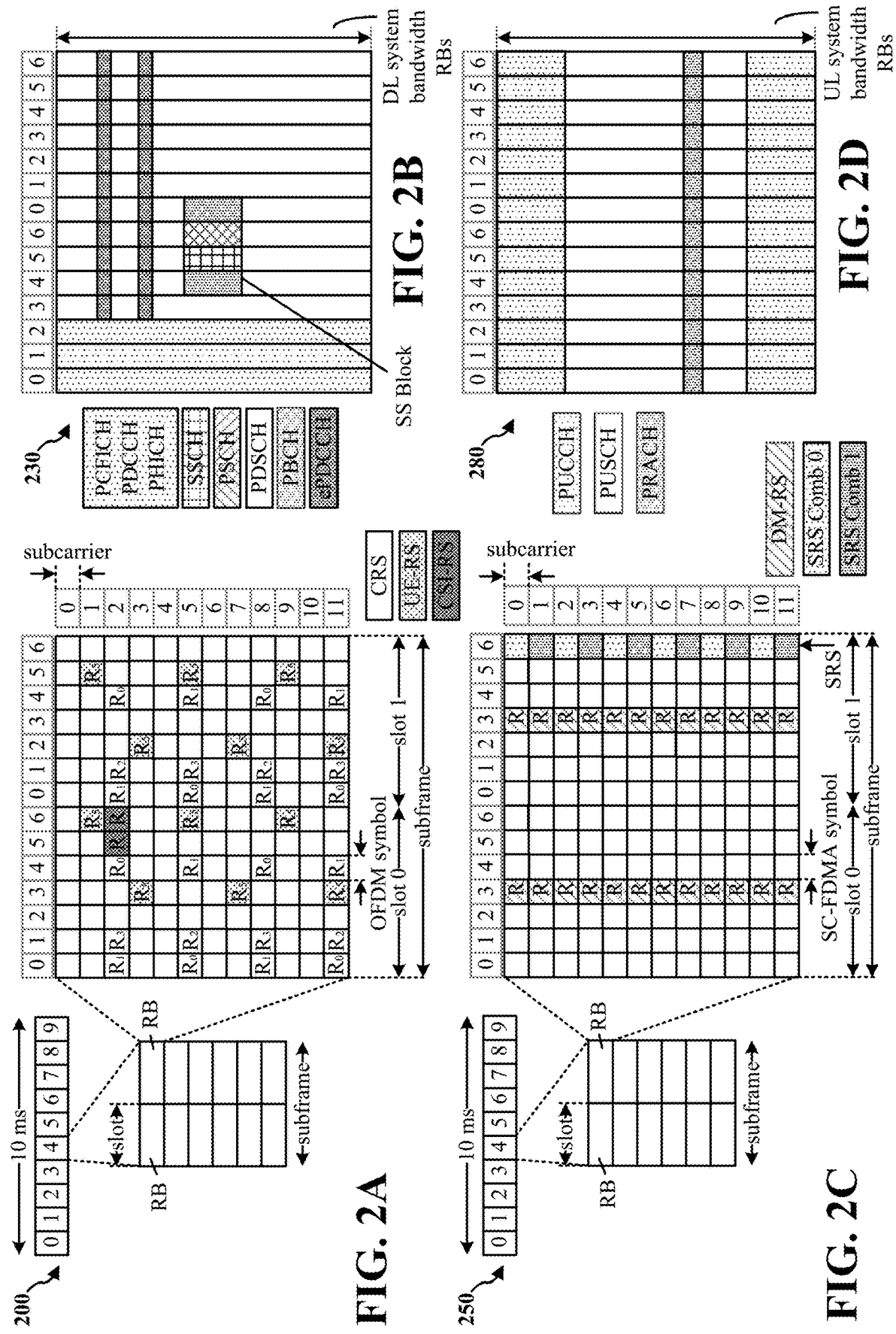
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. For example, aspects of the frame structure may be employed for a 5G/NR frame structure. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
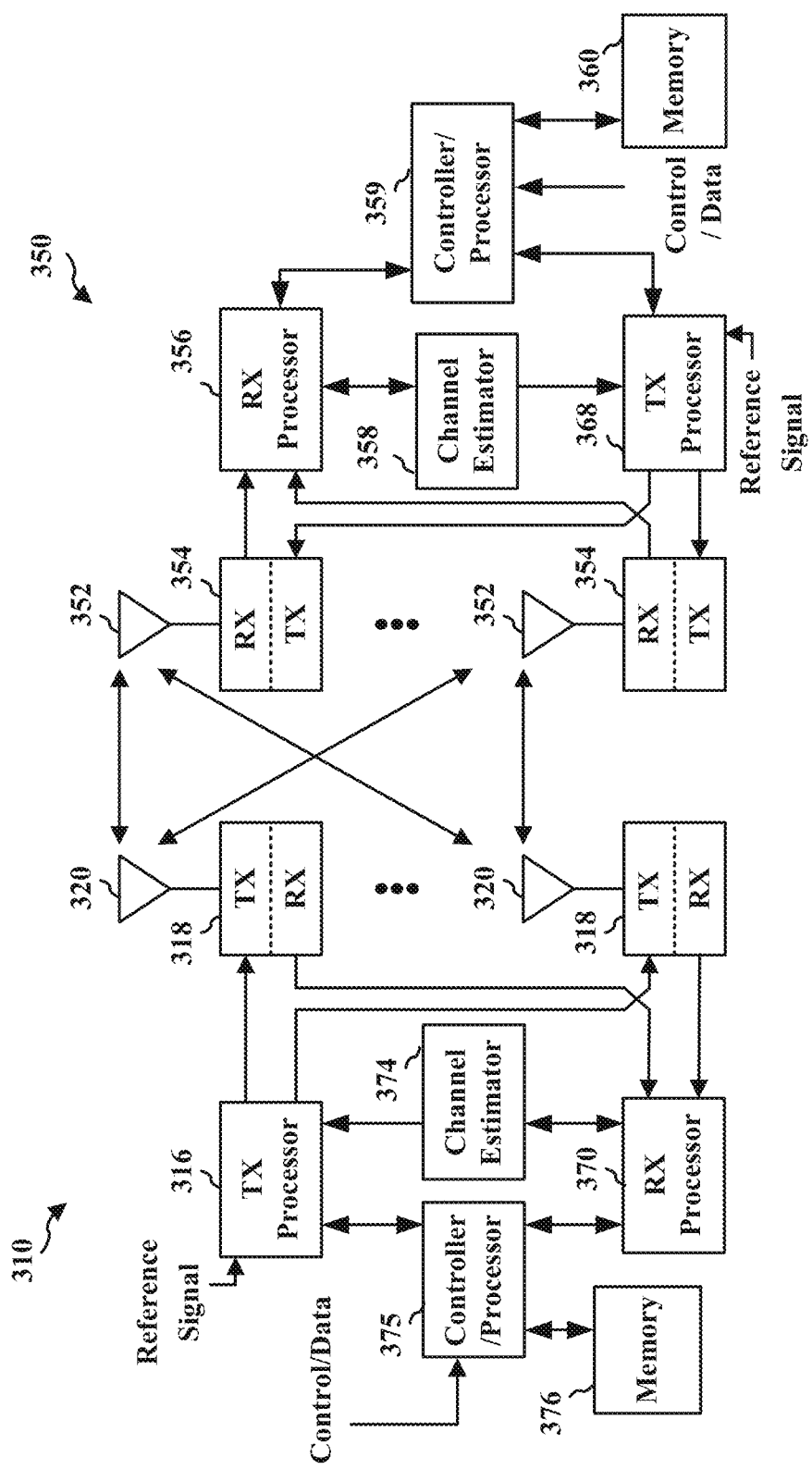
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
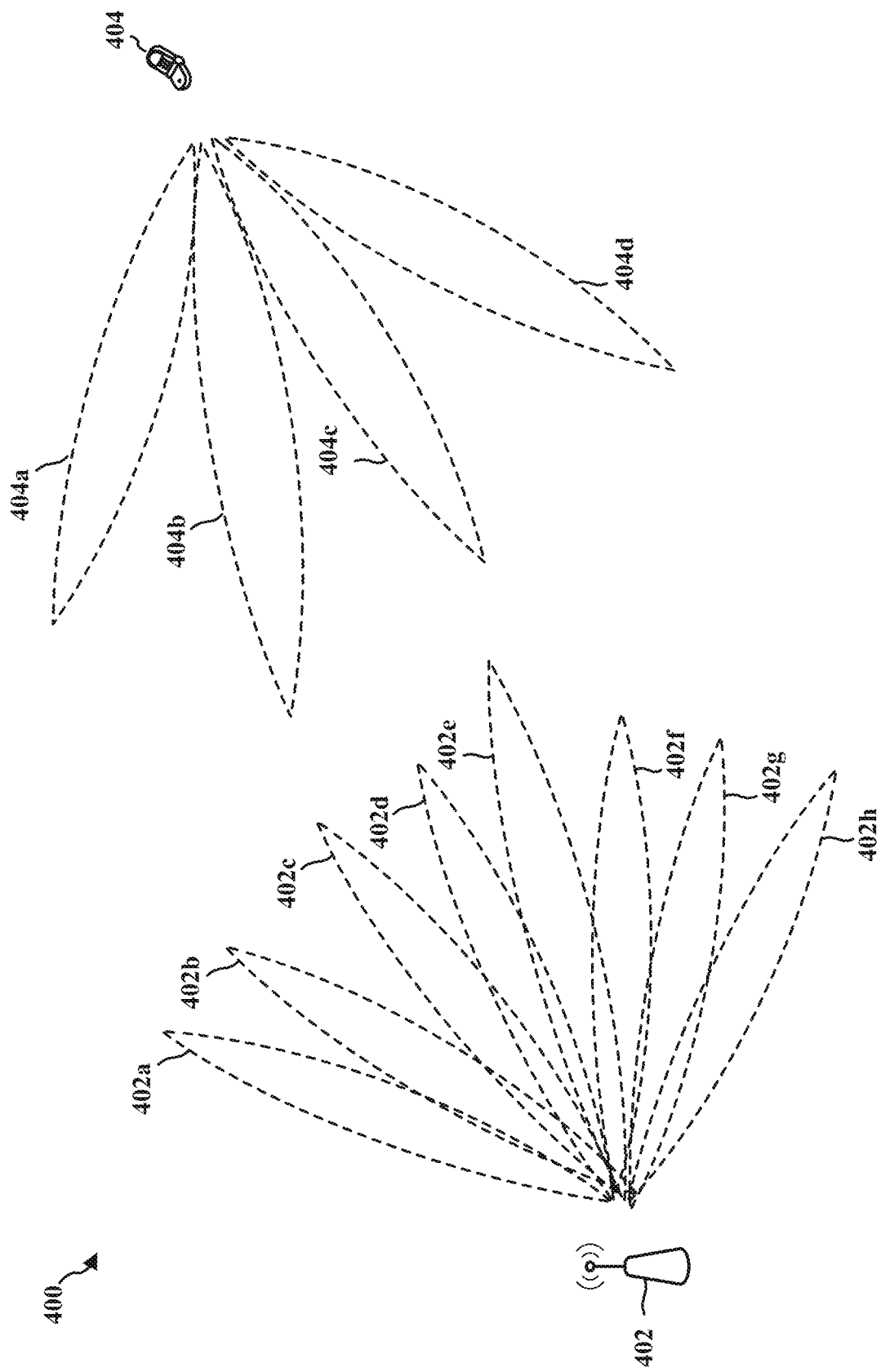
FIG. 4 is a diagram illustrating a base station in communication with a UE.

FIG. 4 is a diagram 400 illustrating a base station 402 in communication with a UE 404. Referring to FIG. 4, when the UE 404 turns on, the UE 404 searches for a nearby 5G/NR network. The UE 404 discovers the base station 402, which belongs to a 5G/5G/NR network. The base station 402 may transmit, e.g., an SS block including the PSS, SSS, and the PBCH (including the MIB) periodically in different transmit directions 402a-402h. The UE 404 receives the transmission 402e including the PSS, SSS, and PBCH. Based on the received SS block, the UE 404 synchronizes to the 5G/NR network and camps on a cell associated with the base station 402. The base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5:
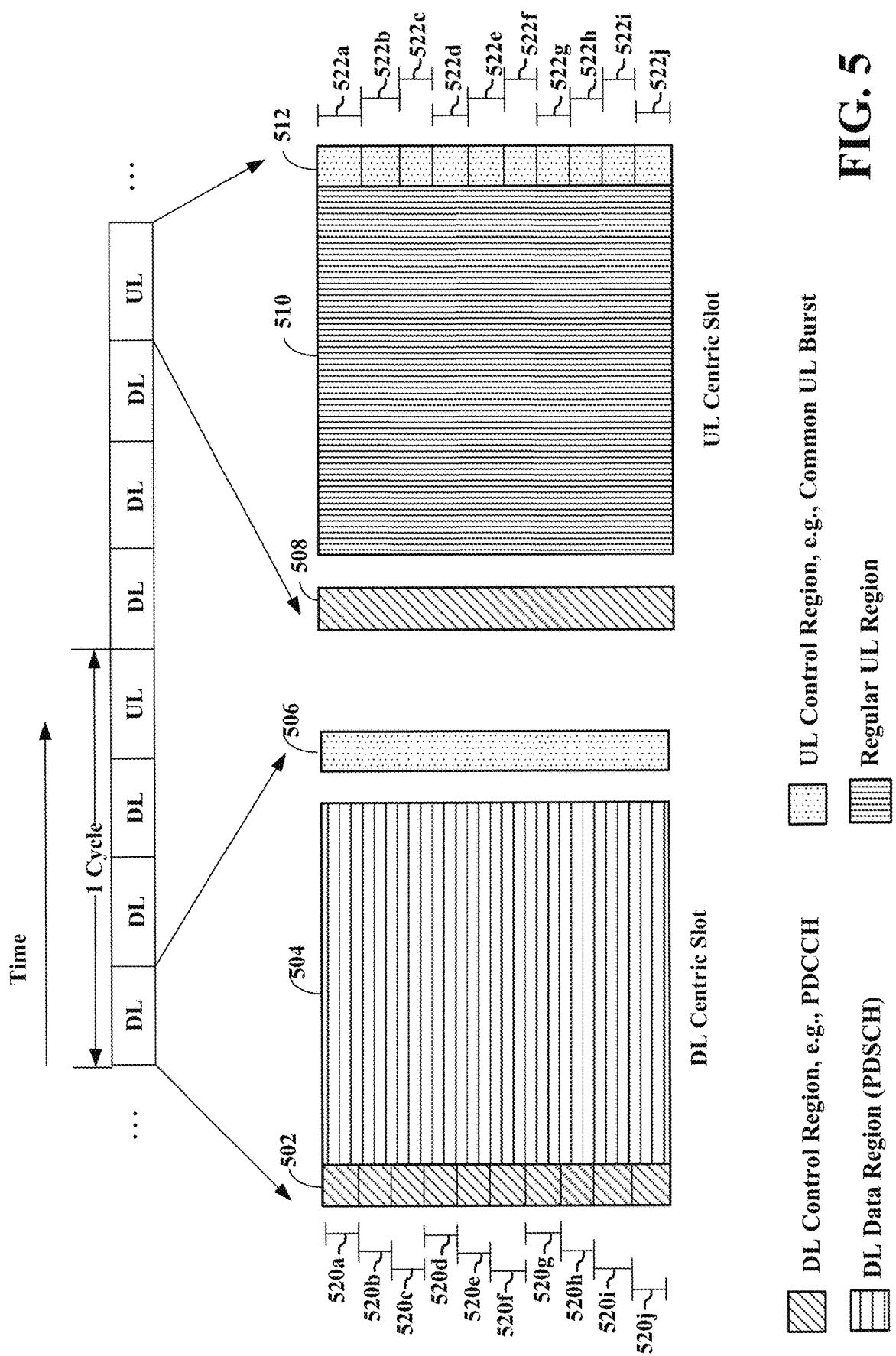
FIG. 5 is a diagram illustrating an example slot structure comprising DL centric slots and UL centric slots.

FIG. 5 illustrates an example slot structure comprising DL centric slots and UL centric slots, which may be employed in 5G/NR wireless communication. In 5G/NR, a slot may have, e.g., a duration of 0.5 ms, 0.25 ms, etc., and each slot may have 7 or 14 symbols. A resource grid may be used to represent the time slots, each time slot including one or more time concurrent resource blocks (RBs) (also referred to as physical RBs (PRBs)). The resource blocks for the resource grid may be further divided into multiple resource elements (REs). The number of bits carried by each RE depends on the modulation scheme.

A slot may be DL only or UL only, and may also be DL centric or UL centric. FIG. 5 illustrates an example DL centric slot. The DL centric slot may comprise a DL control region 502, e.g., in which in which physical downlink control channel (PDCCH) is transmitted. Some of the REs of the DL centric slot may carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS).

A DL control region 502, 508 may span one or a few OFDM symbols, e.g., at the beginning of the slot. The DL control region 502, 508 may comprise multiple subbands, e.g., 520a-j illustrated for DL control region 502. The subbands may also be referred to as resource sets. Thus, each subband 520a-j may comprise a resource set that spans only a portion of the bandwidth of the control region 202 rather than the entire bandwidth of the control region. This provides power savings at the UE by allowing the UE to monitor a smaller bandwidth in order to receive control information. FIG. 5 illustrates the control region 502 having 10 subbands, e.g., 10 resource sets. This is only an example, and any number of subbands/resource sets may be comprised in the control region. Additionally, FIG. 5 illustrates the subbands/resource sets 520a-j having a similar size. However, in other examples, the sizes, in frequency, of the subbands/resource sets 520a-j may be different for different subbands/resource sets. DL control region 508 may similarly comprise multiple subbands/resource sets. The subbands/resource sets for DL control region 502 of a DL centric slot may be the same as for DL control region 508 of an UL centric slot. In another example, the subbands/resource sets may be different between the DL centric slot and the UL centric slot.

A base station may use the resource sets of the control region 502, 508 to transmit common control transmissions from the base station. For example, the base station may broadcast a physical broadcast channel (PBCH) that is cell specific and applies to multiple UEs. The PBCH may carry a master information block (MIB). The MIB may carry information such as the number of RBs in the DL system bandwidth and a system frame number (SFN). The base station may also use the resource sets of the control region 502, 508 to transmit UE specific control signaling, e.g., via RRC, etc. The signaling may be specific to a single UE. Other UEs might not be aware of the resources used to transmit UE specific control signaling. Thus, the resource sets may comprise at least one common resource set, e.g., subband, used for common control transmissions and possibly one or more UE specific resource set, e.g., subband, used for UE specific control transmissions.

The DL centric slot may comprise a DL data region 504, e.g., in which a physical downlink shared channel (PDSCH) carries user data, broadcast system information not transmitted through the PBCH such as system information blocks (SIBs), and paging messages.

The DL centric slot may also comprise a common UL burst region (ULCB) 506 in which UEs may send UL control channel information or other time sensitive or otherwise critical UL transmissions. This ULCB region may also be referred to as an UL control region 506.

The UL control region 506 of the DL centric slot, and similarly, the UL control region 512 of the UL centric slot may be subdivided into subbands/resource sets 522a-522j. FIG. 5 illustrates the UL control region 506, 512 having 10 subbands/resource sets. This is only an example, and any number of subbands/resource sets may be comprised in the control region. Additionally, FIG. 5 illustrates the subbands/resource sets 522a-j having a similar size. However, in other examples, different subbands/resource sets 522a-j may have different bandwidths A UE may transmit physical uplink control channel (PUCCH), sounding reference signals (SRS), physical random access channel (PRACH), etc. in the UL control regions 506, 512. The SRS may be used by an eNB for channel quality estimation to enable frequency-dependent scheduling on the UL. The PRACH may be included within one or more slots within a slot structure based on the PRACH configuration. The PRACH allows the UE to perform initial system access and achieve UL synchronization. The UL control region 506, 512 may comprise a PUCCH that carries uplink control information (UCI), such as scheduling requests, a channel quality indicator (CQI), a precoding matrix indicator (PMI), a rank indicator (RI), and HARQ ACK/NACK feedback.

Similar to the DL centric slot, the UL centric slot may comprise a DL control region 508, e.g., for PDCCH transmissions. The DL control region 502, 508 may comprise a limited number of symbols at the beginning of a slot. The UL centric slot may comprise an UL data region 510, e.g., for the transmission of a Physical Uplink Shared Channel (PUSCH) that carries data, and may additionally be used to carry a buffer status report (BSR), a power headroom report (PHR), and/or UCI. The UL data region 510 may be referred to as a UL regular burst (ULRB) region.

Radio Link Monitoring

Radio Link Monitoring (RLM) may be an important procedure to track radio link conditions. For example, two thresholds may be defined in tracking the radio link conditions, e.g., $Q_{in}$ and $Q_{out}$. A first threshold, e.g., $Q_{in}$, may correspond to a first block error rate (BLER) of a hypothetical PDCCH that indicates an in-sync condition of the radio link, while a second threshold, e.g., $Q_{out}$, may correspond to a second BLER that indicates an out-of-sync condition of the radio link. The first threshold may comprise a lower BLER than the second threshold, e.g., the first threshold may comprise a 10% BLER, whereas the second threshold may comprise a 2% BLER. These thresholds may be based on static parameters of a hypothetical PDCCH transmission.

An RLM procedure may comprise two types of indications, e.g., "out-of-sync" indicating that the radio link condition is poor and "in-sync" indicating that the radio link condition is acceptable and the UE is likely to receive a PDCCH transmitted on the radio link. An Out-of-Sync condition may be declared when the block error rate for the radio link falls before the $Q_{out}$ threshold over a specified time interval, e.g., a 200 ms time interval. An in-sync condition may be declared when a block error rate for the radio link is better than the $Q_{in}$ threshold over a second, specified time interval, e.g., over 100 ms time interval. The first and second time intervals may be the same or may be different.

If the UE receives a number n of consecutive out-of-sync measurements, then UE may start a timer, e.g., oft seconds, to get back in sync. The numbers n and t may be a configured parameter, e.g., a static parameter.

If the UE detects a number m of consecutive In-Sync indications the timer may be stopped, as the UE has determined an in-sync condition for the radio link. Similar to n and t, the number m may be a configured parameter. However, if the UE does not detect m consecutive In-Sync indications before the timer t expires, the UE may declare an RLF.

There is a need for a more robust RLF procedure for 5G/NR. For example, in 5G/NR, an RLM procedure may be used to infer a radio link quality for a hypothetical PDCCH (e.g., a potential PDCCH that may be transmitted by the base station) based on measurements for a different signal using static parameters. For example, in 5G/NR, a PDCCH may be transmitted over a beam that is QCL with a signaled SS port set or a CSI-RS port set. For example, two antenna ports may be said to be quasi co-located if properties of the channel over which a symbol on one antenna port is conveyed can be inferred from the channel over which a symbol on the other antenna port is conveyed. QCL may support various functionalities, including, e.g., beam management functionality at least including spatial parameters, frequency/timing offset estimation functionality at least including Doppler/delay parameters, and RRM management functionality at least including average gain. QCL may be indicated between ports. As the SS/CSI-RS port sets are QCL with the port for the transmission of the PDCCH, the UE may use measurements for the SS/CSI-RS to infer a signal quality for a channel over which PDCCH is transmitted by observing the channel over which the SS/CSI-RS port set is transmitted. The UE may be able to infer parameters of the channel (such as delay spread, Doppler, etc.) over which PDCCH is transmitted, by observing the channel over which the SS/CSI-RS port set is transmitted The UE might also be able to infer spatial parameters of the PDCCH beam from the SS beam. The PDCCH beam might have differences from the SS/CSI-RS beam, but could be very similar to the SS/CSI-RS beam. Thus, at times, the inferred radio link quality may not be accurate for the PDCCH. For example, even though a base station might be able to power boost the PDCCH, the UE may declare a RLF based on an out-of-sync determination that is based on static parameters.

A more robust solution is provided by having the network signal dynamic parameters to the UE to assist the UE in making a more accurate in-sync/out-of-sync determination in connection with RLM for 5G/NR. For example, the base station may signal any of a number of dynamic parameters to the UE. Thus, the base station may signal an adjustment parameter to the UE, and the UE may use the adjustment parameter to apply a correction to the predicted RLM measurement of the hypothetical PDCCH based on the SS/CSI-RS signal. In certain examples, the dynamic parameter, e.g., adjustment parameter may relate to any of a traffic to pilot ratio (TPR) of a hypothetical PDCCH, beam relations between a reference signal used for RLM and a PDCCH beam, beamforming gain differences of a hypothetical PDCCH, beam width differences of a hypothetical PDCCH, beam orientation differences of a hypothetical PDCCH. The beam gain differences, beam width differences, or beam orientation differences of the hypothetical PDCCH may be indicated with respect to a reference signal that the UE uses to perform RLM. A indication relating to TPR, beamforming gain, beam orientation, etc. are merely examples of potential adjustment parameters. Other offsets or adjustments may also be indicated to the UE to assist the UE in deriving a quality determination for a hypothetical PDCCH. The UE may then use this information regarding the adjustment parameter(s) to derive a more accurate quality determination for the link, e.g., for better RLM performance.

As described above, the PDCCH may be transmitted over a beam using ports that are QCL with a SS port set or a CSI-RS port set. Thus, the UE may assume a same antenna port between the SS/CSI-RS used for RLM and a hypothetical PDCCH. The PDCCH beam might be very similar to the sync beam or the CSI-RS beam, but the PDCCH beam might not be exactly the same. For example, the PDCCH beam might have a narrower beam width than the sync/CSI-RS beams, have a different beam orientation, might be transmitted with a higher power than the sync/CSI-RS beams, etc.

Figure 6:
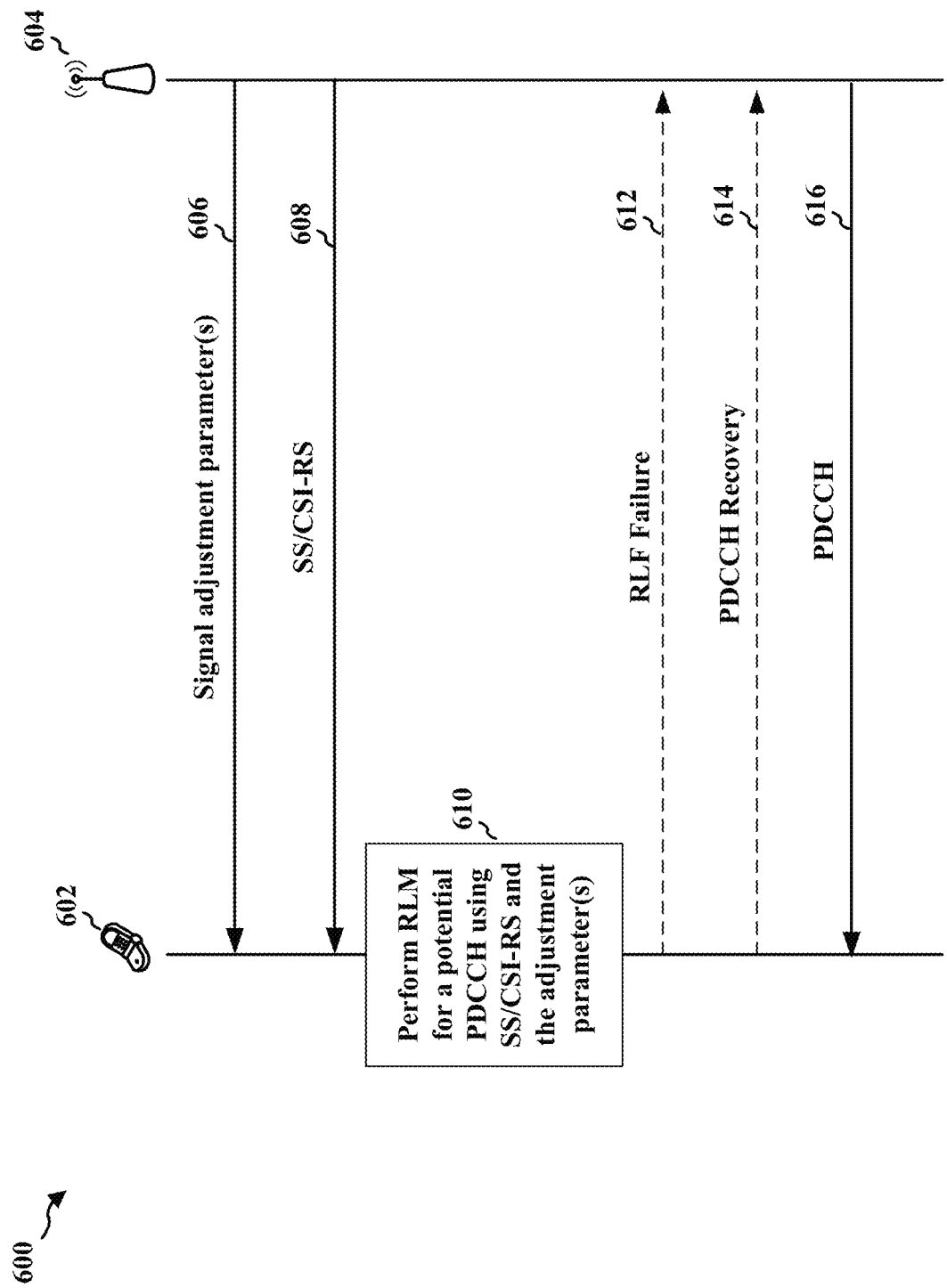
FIG. 6 is a diagram illustrating and example signal flow between a base station and a UE.

As illustrated in the signal flow diagram 600 of FIG. 6, the base station 604 (e.g., 102, 180, 310, 402, 1050, 1302, 1302') may signal an indication 606 of at least one adjustment parameter, e.g., dynamic differences between the PDCCH beam and the reference signal beam that may be measured for RLM, e.g. a SS/CSI-RS beam, by the UE 602 (e.g., e.g., UE 104, 350, 404, 1350, the apparatus 1002, 1002'). The base station may signal such adjustment parameter(s) to the UE at 606 using any of RRC signaling, a MAC CE, or DCI, among others. The base station may transmit SS or CSI-RS at 608, which the UE may measure to infer a signal quality for a hypothetical PDCCH, e.g., PDCCH 616, that will be transmitted from the BS 604 and received by the UE 602. As illustrated at 610, the UE may use the adjustment parameter (s) to infer a radio link quality for a hypothetical PDCCH using the SS/CSI-RS measurement, e.g., as a metric for determining an in-sync or out-of-sync condition. The UE may assume a same antenna port for the PDCCH as for the other RS upon which the RLM measurement is based.

The UE may measure the reference signal port(s), e.g., SS/CSI-RS port(s), and may apply a correction to the measurement based on the indicated difference between the PDCCH beam and the reference signal beam. The UE may then use the corrected measurement to derive a radio quality link, e.g., by applying the configured thresholds to make an in-sync/out-of-sync determination. For example, the thresholds may be the same as or similar to $Q_{in}$ and $Q_{out}$. Different threshold values may also be applied to determine the radio quality link. As described in connection with 906, 912, and 1014 in FIGS. 9 and 10, a UE may apply a configured threshold or a second, adjusted configured threshold to determine a radio link quality for the PDCCH. The UE may compare the measurement to the threshold/adjusted threshold based on the indication from the base station.

In an example, the radio quality measurement and in-sync/out-of-sync determination may be used to trigger a PDCCH beam recovery at 614. As 614 is an optional aspect, it is illustrated with a dashed line. In another example, the radio quality measurement and in-sync/out-of-sync determination may be used to trigger an RLF procedure 612. PDCCH beam recovery may include, e.g., triggering a measurement report, sending an SR to request a new beam, etc. An RLF procedure may include, e.g., signaling to higher layer that radio link has failed, and ting RRC connection re-establishment.

Figure 7:
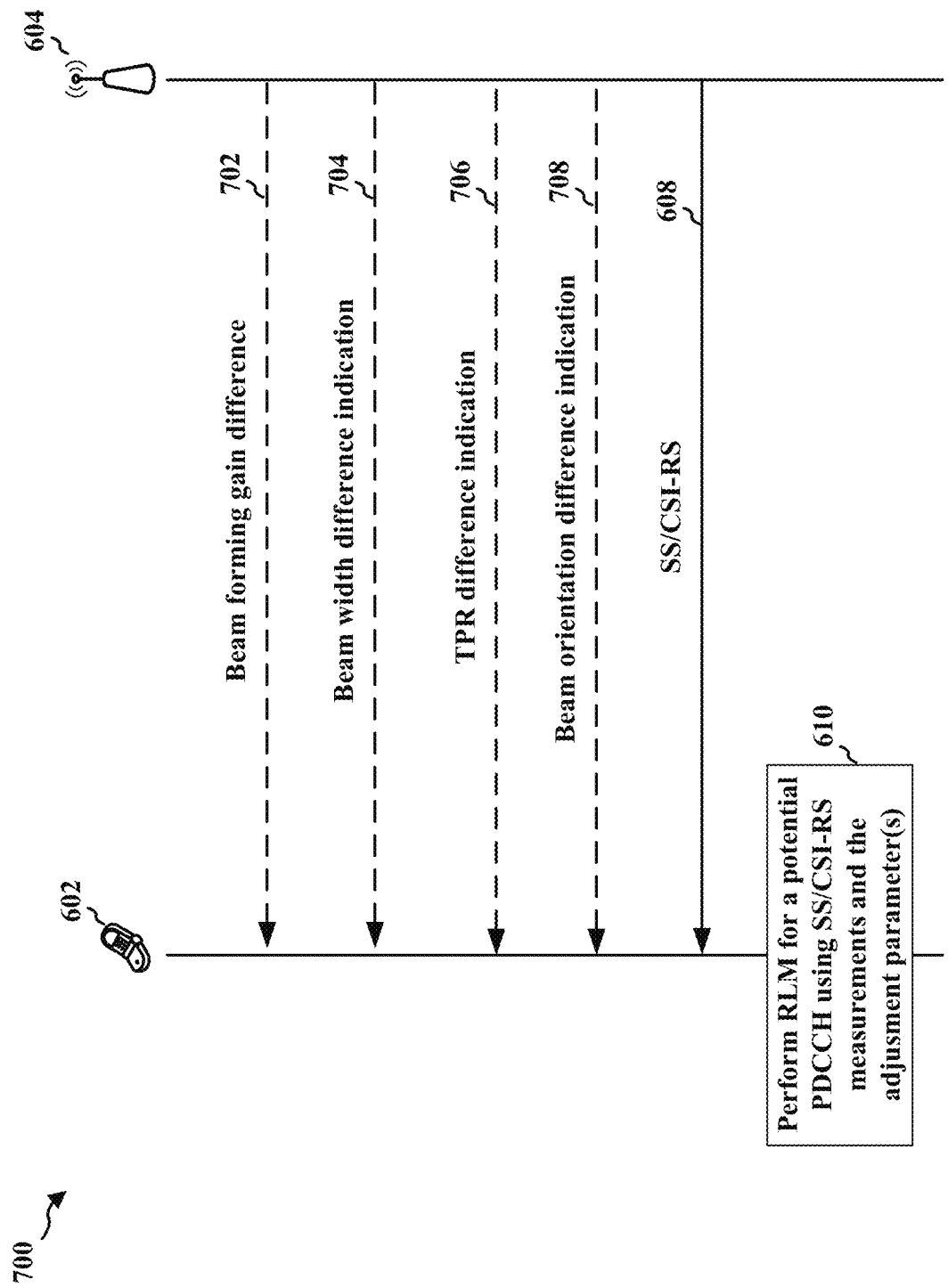
FIG. 7 is a diagram illustrating and example signal flow between a base station and a UE.

The indication of the dynamic difference(s)/adjustment(s) between the PDCCH and the reference signal used for measurement may include any of various characteristics. FIG. 7 illustrates a signal flow diagram 700 of communication between the UE 602 and the base station 604 that illustrates examples of various characteristics that may be indicated to the UE 602 from the base station 604. These differences/adjustment parameters are merely examples. Other offset(s)/adjustment parameter(s) may be indicated to the UE and used by the UE to predict/derive a BLER for a hypothetical PDCCH based on measurements of a reference signal that is assumed to be QCL with the hypothetical PDCCH.

In a first example, the base station may signal a beam forming gain difference 702 between the PDCCH beam and the SS/CSI-RS beam(s) to the UE. As a part of 610, the UE may apply a correction to the measured SS/CSI-ports based on the indicated beam forming gain or may apply a correction to the configured thresholds based on the beam forming gain in order to determine a more accurate radio link quality for the PDCCH.

In a second example, the base station may signal information regarding a beam width relationship between the PDCCH beam and the SS/CSI-RS beam(s) to the UE at 704. The UE may estimate a hypothetical delay spread for the PDCCH in relation to the SS/CSI-RS beams, because a narrower beam implies a generally narrower delay spread. As a part of 610, the UE may then apply a correction to the measured SS/CSI-ports based on the hypothetical delay spread or may apply a correction to the configured thresholds based on the hypothetical delay spread in order to determine a more accurate radio link quality for the PDCCH.

In a third example, the base station may signal a higher TPR for the PDCCH with respect to the SS/CSI-RS to the UE at 706. The UE may measure the SS/CSI-RS ports. As a part of 610, the UE may then apply a correction to the measured energy for the SS/CSI-ports based on the indicated TPR difference or may apply a correction to the configured thresholds based on the TPR difference in order to determine a more accurate radio link quality for the PDCCH.

In a fourth example, the base station may signal information regarding a beam orientation relationship between the PDCCH beam and the SS/CSI-RS beam(s) to the UE at 708. The UE may measure the SS/CSI-RS ports. As a part of 610, the UE may then apply a correction to the measured SS/CSI-ports based on the beam orientation difference or may apply a correction to the configured thresholds based on the beam orientation difference in order to determine a more accurate radio link quality for the PDCCH.

Figure 8:
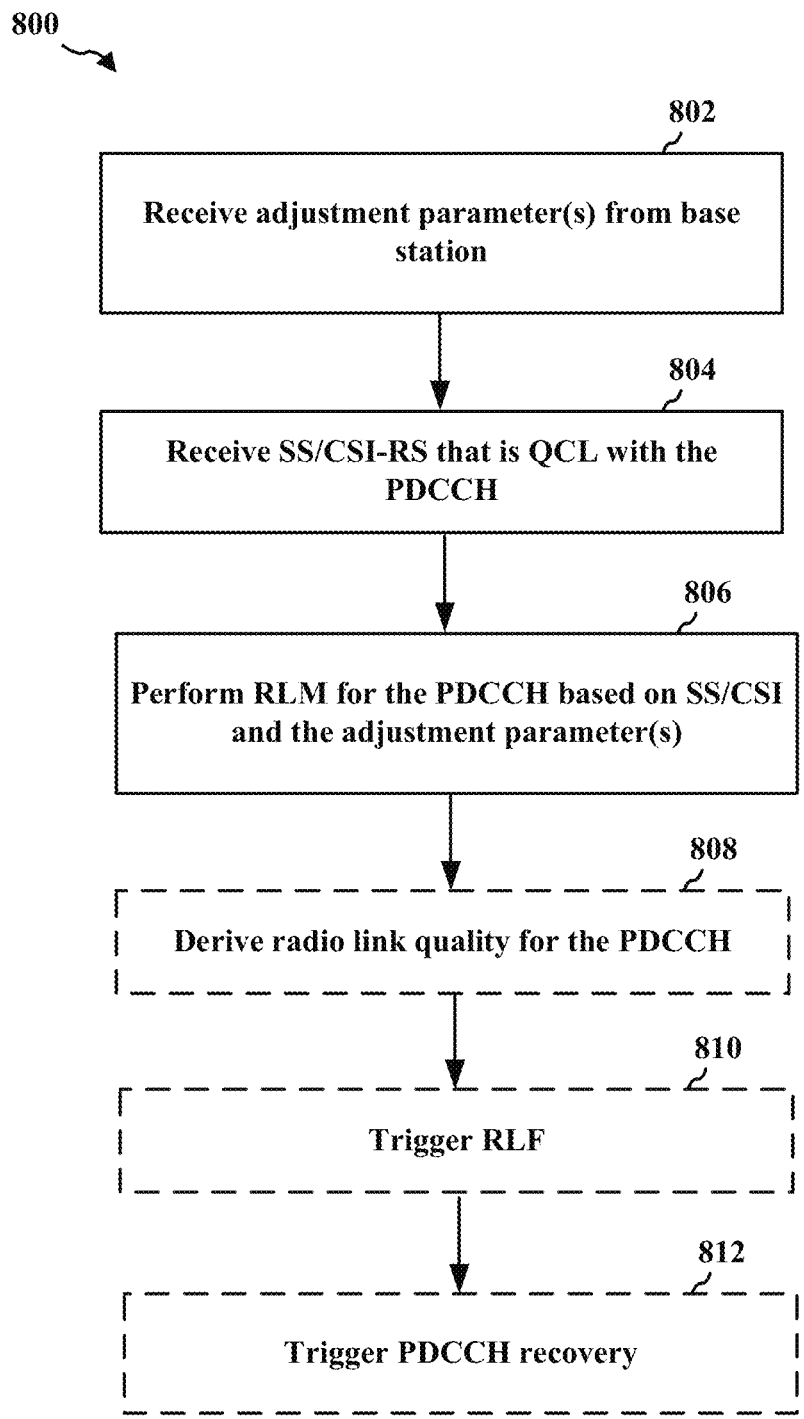
FIG. 8 is a flowchart of a method of wireless communication.

FIG. 8 is a flowchart 800 of a method of wireless communication. The method may be performed by a UE (e.g., UE 104, 350, 404, 602, 1350, the apparatus 1002, 1002') communicating wirelessly with a base station (e.g., the base station 102, 180, 310, 402, 604, 1050, apparatus 1302, 1302').

At 802, the UE receives at least one adjustment parameter regarding a PDCCH from a base station. The adjustment parameter may comprise a dynamic parameter. The adjustment parameter may comprise a relationship between a first beam width of the PDCCH and a second beam width of the at least one of the SS or the CSI-RS, e.g., as described in connection with FIG. 7. The adjustment parameter may comprise a relationship between a first transmission power of the PDCCH and a second transmission power of the at least one of the SS or the CSI-RS, e.g., as described in connection with FIG. 7. The adjustment parameter may comprise a relationship between a first TPR of the PDCCH and a second TPR of the at least one of the SS or the CSI-RS, e.g., as described in connection with FIG. 7. The adjustment parameter may comprise a relationship between a first beam orientation of the PDCCH and a second beam orientation of the at least one of the SS or the CSI-RS, e.g., as described in connection with FIG. 7. The adjustment parameter may comprise a beamforming gain difference between the PDCCH and the at least one of the SS or the CSI-RS, e.g., as described in connection with FIG. 7. These examples of potential adjustment parameters are merely examples. Other offset(s)/adjustment parameter(s) between the measured reference signal and the hypothetical PDCCH may be indicated to the UE for use in deriving a BLER for the hypothetical PDCCH based on the reference signal. The adjustment parameter may be received at 802 as at least one of RRC signaling, a MAC control element, or DCI.

At 804, the UE receives, from the base station a reference signal over a first port that is QCL with a second port of the PDCCH. The reference signal may comprise at least one of an SS/CSI-RS over a first port that is QCL with a second port of the PDCCH. The UE may measure energy on the SS/CSI-RS port(s) based on the received reference signal.

At 806, the UE performs a radio link measurement for the hypothetical PDCCH based on the received at least one of the SS or the CSI-RS using the adjustment parameter(s) regarding the PDCCH. The UE may perform a radio link measurement based on the received the SS/CSI-RS to derive a radio link measurement for the hypothetical PDCCH using the adjustment parameter regarding the PDCCH. For example the UE may estimate or otherwise predict a link quality for the hypothetical PDCCH based on the received SS/CSI-RS by applying a correction based on the adjustment parameter.

The UE may further derive a radio link quality for the hypothetical PDCCH at 808 based on the at least one of the SS or the CSI-RS using a configured threshold and the dynamic parameter. The configured threshold may be a static threshold that is known by the UE. For example, such static parameters may be defined in a specification or predefined in another manner. For example, static parameters such as an in-sync threshold, an out-of-sync threshold, a time t for a timer, a number n of out-of-sync indications, or a number m of in-sync indications, as discussed supra for RLM are examples of such configured parameters. In other examples, the parameters may be indicated to the UE. The UE may perform at least one of a PDCCH beam recovery at 812 or a radio link failure procedure at 810, when the derived radio link quality from 808 is below a first level. Thus, when the derived radio link quality is below a desired level, either an RLF or a PDCCH recovery may be triggered.

Figure 9:
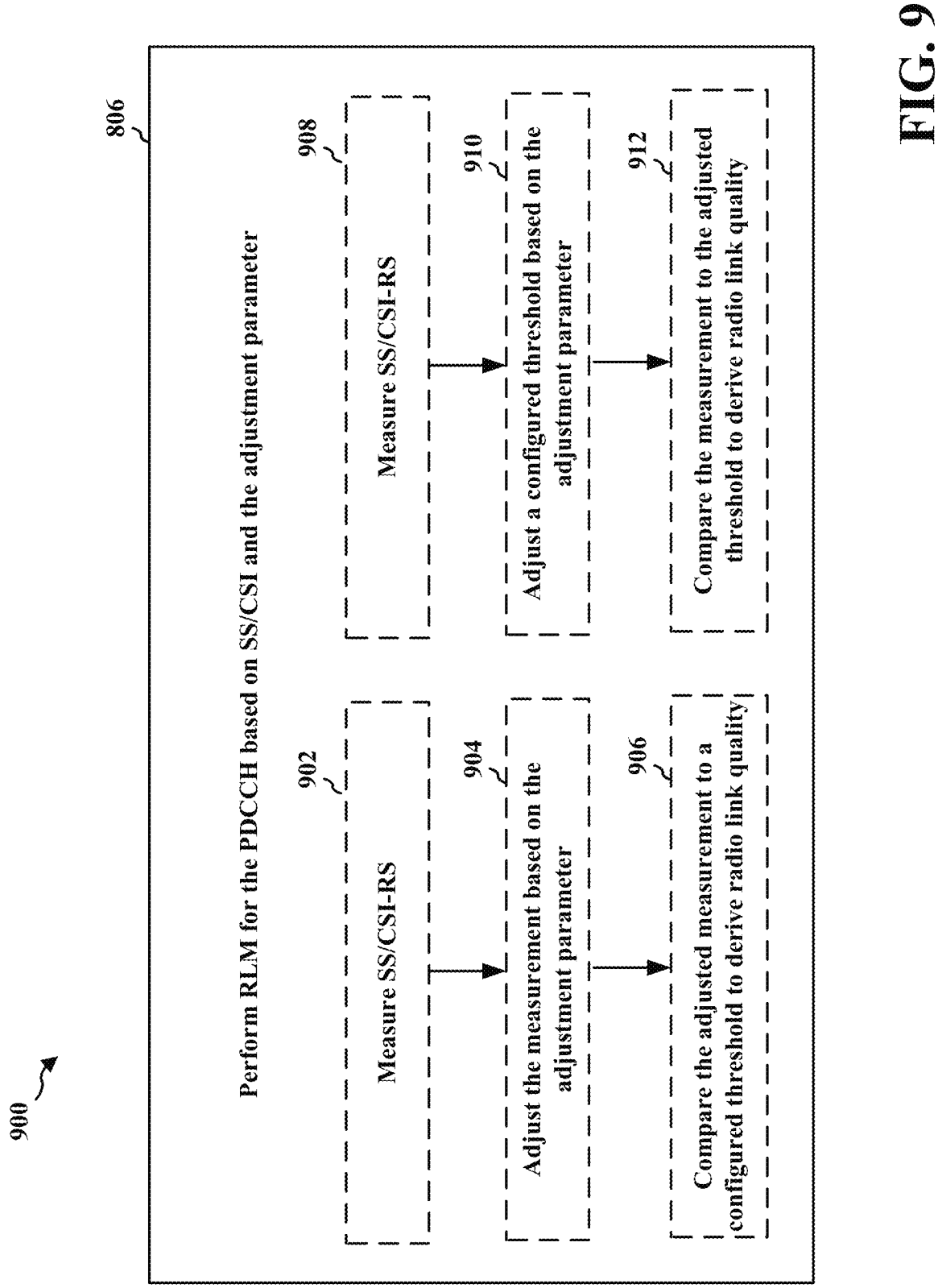
FIG. 9 is a flowchart of a method of wireless communication.

As illustrated in the flowchart 900 of FIG. 9, in performing the radio link measurement at 806, the UE may measure the at least one of the SS or the CSI-RS at 902. The UE may measure a channel energy or SNR at the SS/CSI-RS port(s). At 904, the UE may adjust the measurement based on the adjustment parameter(s) regarding the PDCCH. The adjustment parameter(s) may comprise a dynamic parameter. Then, at 906, the UE may compare the adjusted measurement to a configured threshold to derive a radio link quality. As an alternative way to derive the radio link quality, the UE may measure a signal quality for the at least one of the SS or the CSI-RS at 908. Then, at 912, the UE may compare the measurement to the adjusted, configured threshold to derive a radio link quality. The adjusted threshold may comprise a second threshold. Thus, the apparatus may compare the measurement to either a first threshold or the second threshold. Thus, rather than comparing the measurement to the configured threshold, as at 906, the UE may compare the measurement to the second configured (e.g., adjusted) threshold. At 910, the UE may adjust a configured threshold based on the adjustment parameter regarding the PDCCH. Adjusting the configured threshold may correspond to selecting the adjusted threshold. As described in connection with radio link quality component 1014, derivation of a radio link quality may comprise comparing a measurement to the configured threshold or comparing the measurement to an adjusted threshold. For example, the adjustment parameter may comprise an indication between two/more thresholds to enable the UE to select an adjusted, configured threshold.

Figure 10:
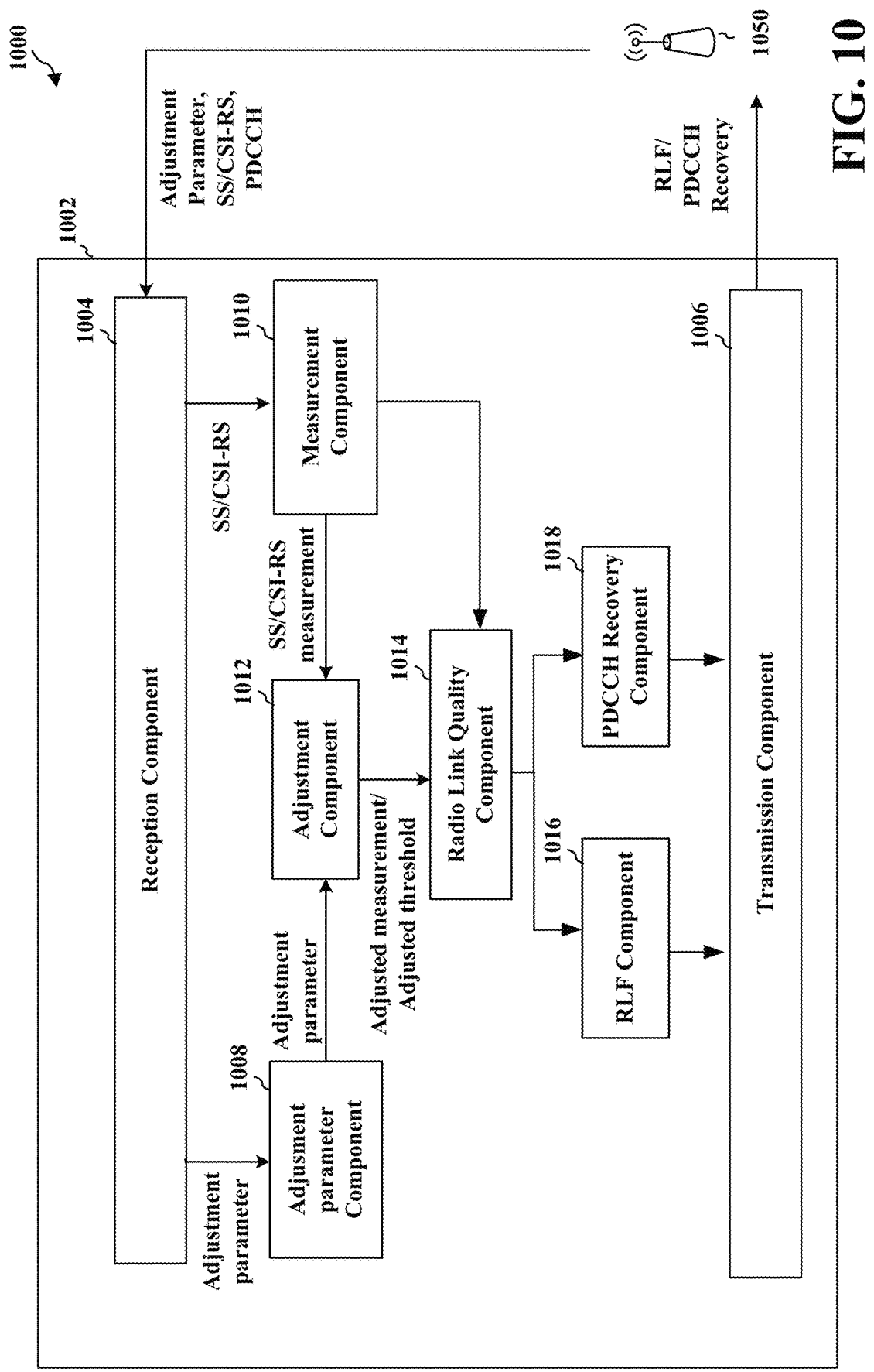
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., UE 104, 350, 404, 602, 1350) communicating wirelessly with a base station 1050 (e.g., the base station 102, 180, 310, 402, 604 apparatus 1302, 1302'). The apparatus includes a reception component 1004 configured to receive DL communication from a base station 1050, including SS/CSI-RS, and a transmission component 1006 configured to transmit UL communication with the base station 1050. The apparatus may include an adjustment parameter component 1008 configured to receive an adjustment parameter(s) regarding a PDCCH, which may be received via the reception component 1004. The apparatus may include a measurement component 1010 that measures a SS/CSI-RS that is received by the reception component 1004. The apparatus may comprise an adjustment component 1012 configured to adjust at least one of the measurement and a configured parameter based on the adjustment parameter. The apparatus may comprise a radio link quality component 1014 configured to derive a radio link quality. The derivation may comprise comparing an adjustment measurement to the configured threshold or comparing the measurement to an adjusted threshold. An adjusted threshold may comprise a second threshold. Thus, the apparatus may compare the measurement to either a first threshold or the second, adjusted threshold. The apparatus may include an RLF component 1016 configured to perform an RLF procedure when the derived quality is below a desired threshold. The apparatus may comprise a PDCCH recovery component 1016 configured to perform a PDCCH recovery when the derived quality is below a desired threshold.

The apparatus may include additional components that perform each of the blocks of the algorithm in the aforementioned flowcharts of FIGS. 6, 7, 8, and 9. As such, each block in the aforementioned flowcharts of FIGS. 6, 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
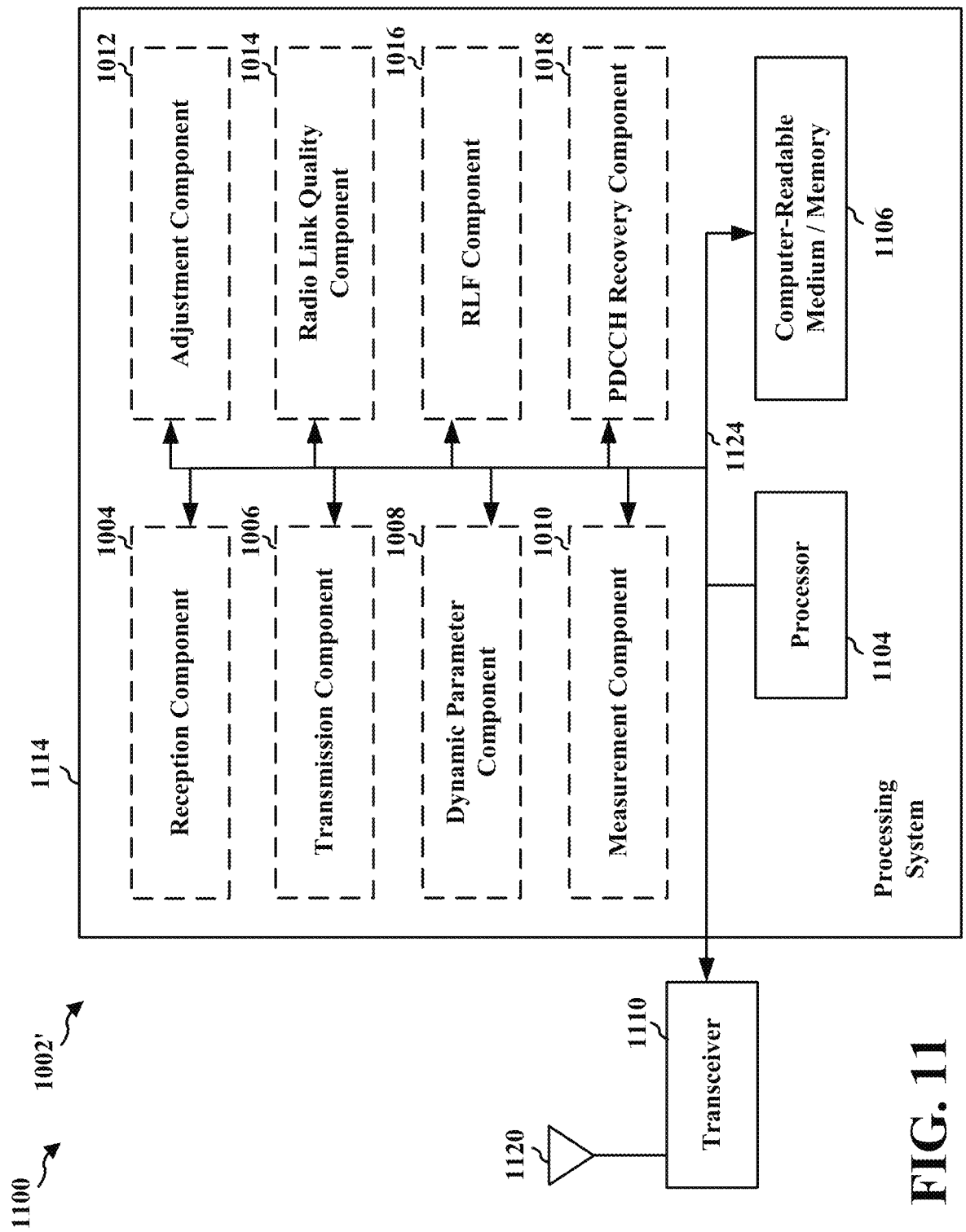
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving an adjustment parameter regarding a PDCCH (e.g., 1008), means for receiving a SS/CSI-RS (1004), means for performing a radio link measurement based on the received SS/CSI-RS and the adjustment parameter (1010), means for measuring the SS/CSI-RS (e.g., 1010), means for adjusting at least one of the measurement and a configured parameter based on the adjustment parameter (1012), means for deriving a radio link quality (1014), means for performing an RLF procedure (1016), and means for performing a PDCCH recovery (1018). The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
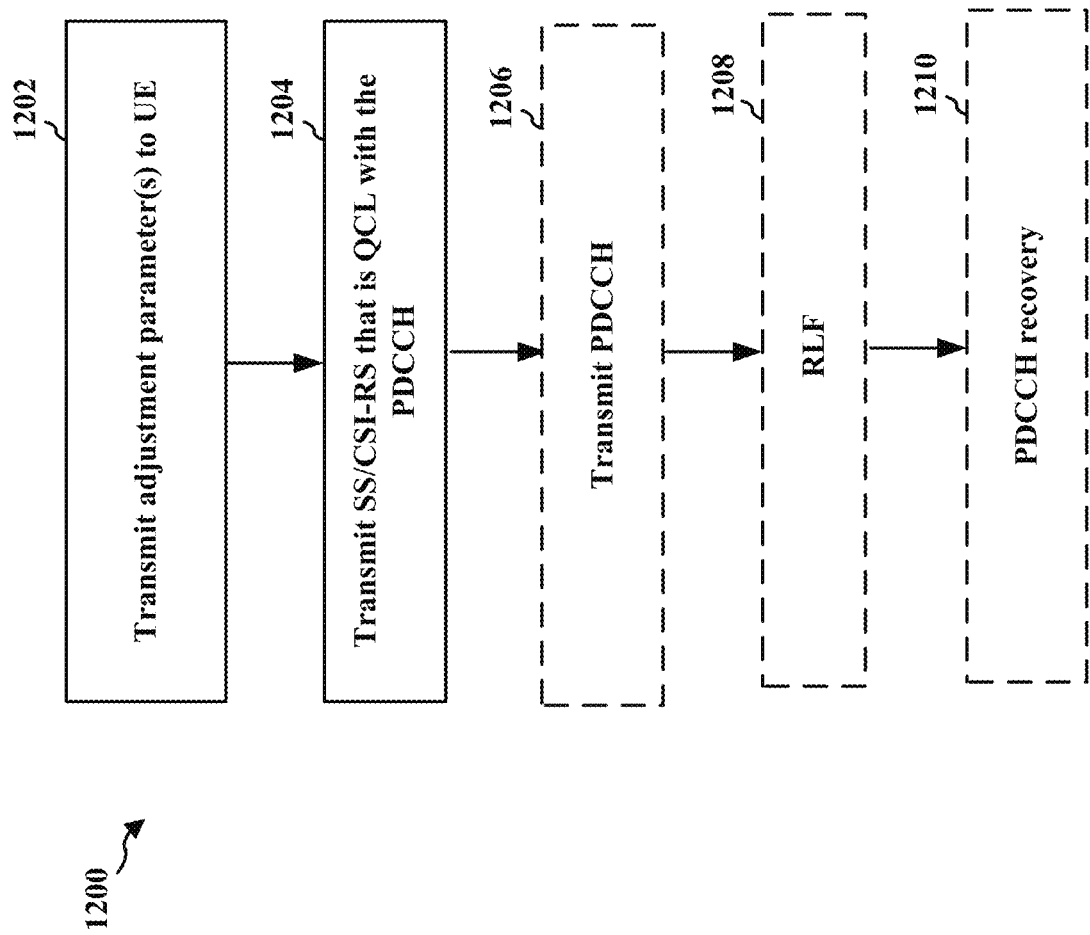
FIG. 12 is a flowchart of a method of wireless communication.

FIG. 12 is a flowchart 1200 of a method of wireless communication. The method may be performed by a base station, e.g., base station 102, 180, 310, 402, 604, 1050, the apparatus 1302, 1302', wirelessly communicating with a UE, e.g., UE 104, 350, 404, 602, 1350, the apparatus 1002, 1002'). At 1202, the base station may transmit at least one adjustment parameter to the UE regarding a PDCCH from the base station, e.g., PDCCH transmitted at 1206. At 1204, the base station may transmit, to the UE, at least one of an SS or a CSI-RS over a first port that is QCL with a second port of the PDCCH.

The adjustment parameter may comprise a relationship between the PDCCH and the at least one of the SS or the CSI-RS for deriving a radio link quality. The adjustment parameter may comprise a relationship between a first beam width of the PDCCH and a second beam width of the at least one of the SS or the CSI-RS, e.g., as described in connection with FIG. 7. The adjustment parameter may comprise a relationship between a first transmission power of the PDCCH and a second transmission power of the at least one of the SS or the CSI-RS, e.g., as described in connection with FIG. 7. The adjustment parameter may comprise a relationship between a first TPR of the PDCCH and a second TPR of the at least one of the SS or the CSI-RS, e.g., as described in connection with FIG. 7. The adjustment parameter may comprise a relationship between a first beam orientation of the PDCCH and a second beam orientation of the at least one of the SS or the CSI-RS, e.g., as described in connection with FIG. 7. The adjustment parameter may comprise a beamforming gain difference between the PDCCH and the at least one of the SS or the CSI-RS, e.g., as described in connection with FIG. 7. These are merely examples of the information that may be included in the adjustment parameter. Other differences/offsets may be indicated in the adjustment parameter. The adjustment parameter may be transmitted at 1202 as at least one of RRC signaling, a MAC control element, or DCI.

The adjustment parameter transmitted by the base station at 1202 may be used by the UE to adjust a signal quality in deriving the radio link quality. The adjustment parameter transmitted by the base station may be used by the UE to adjust a configured threshold based in deriving the radio link quality. As described in connection with 912 in FIG. 9 and 1014 in FIG. 10, this may enable the UE to apply a configured threshold or a second, adjusted configured threshold to derive a radio link quality for the PDCCH. When the radio link quality derived at the UE is below a desired threshold, it may trigger an RLF procedure or a PDCCH recovery procedure. For example, when the UE loses a radio link, the UE may signal to UE's higher layers that the radio link has failed. The UE may then start performing a fresh RACH and attempt to re-establish an RRC connection. In another example, a base station may use a time to identify when a UE has lost a radio link, e.g., when the base station has not received communication from the UE for a defined amount of time.

Figure 13:
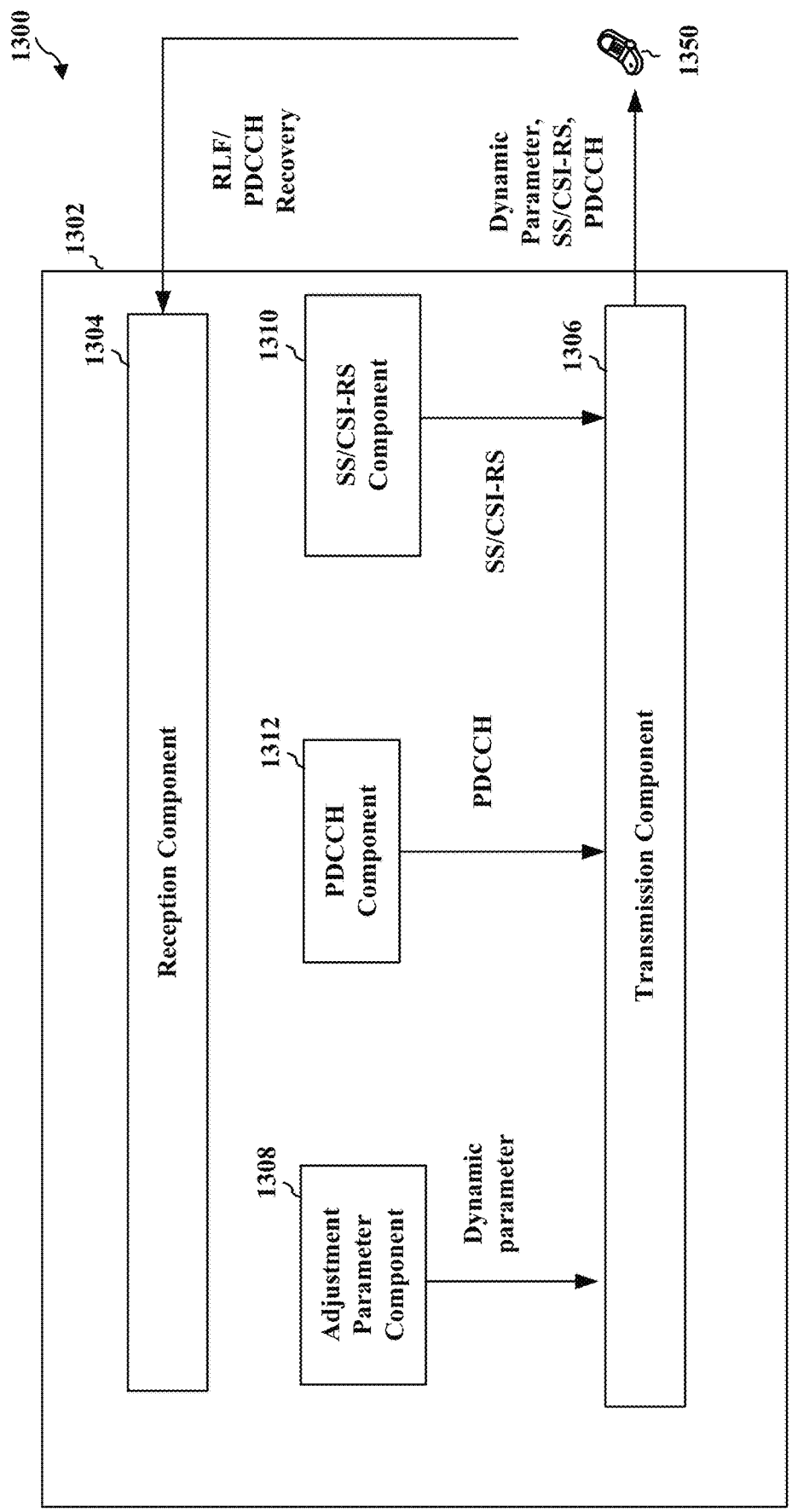
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a base station, e.g., base station e.g., the base station 102, 180, 310, 402, 604, 1050. The apparatus includes a reception component 1304 that is configured to receive UL communication from a UE 1350, e.g., UE 104, 350, 404, 602, the apparatus 1002, 1002'). The apparatus may include a transmission component 1306 configured to transmit DL communication to the UE, including any of an adjustment parameter, a SS/CSI-RS, and a PDCCH. The apparatus may include an adjustment parameter component 1308 configured to transmit, e.g., via transmission component 1306, an adjustment parameter to the UE regarding a PDCCH from the base station. The adjustment parameter may be used to adjust a configured threshold for deriving the radio link quality, e.g., as described in connection with 912 and 1014, the UE may use information from the base station and may compare the a measurement for SS/CSI-RS to either a configured threshold or a second, adjusted configured threshold to derive a radio link quality for the PDCCH. The apparatus may include an SS/CSI-RS component 1310 configured to transmit, via the transmission component 1306, at least one of an SS and a CSI-RS. The apparatus may include a PDCCH component 1312 configured to transmit a PDCCH to the UE, e.g., according to the indicated adjustment parameter.

The apparatus may include additional components that perform each of the blocks of the algorithm in the aforementioned flowcharts of FIG. 6, 7, or 12. As such, each block in the aforementioned flowcharts of FIG. 6, 7, or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
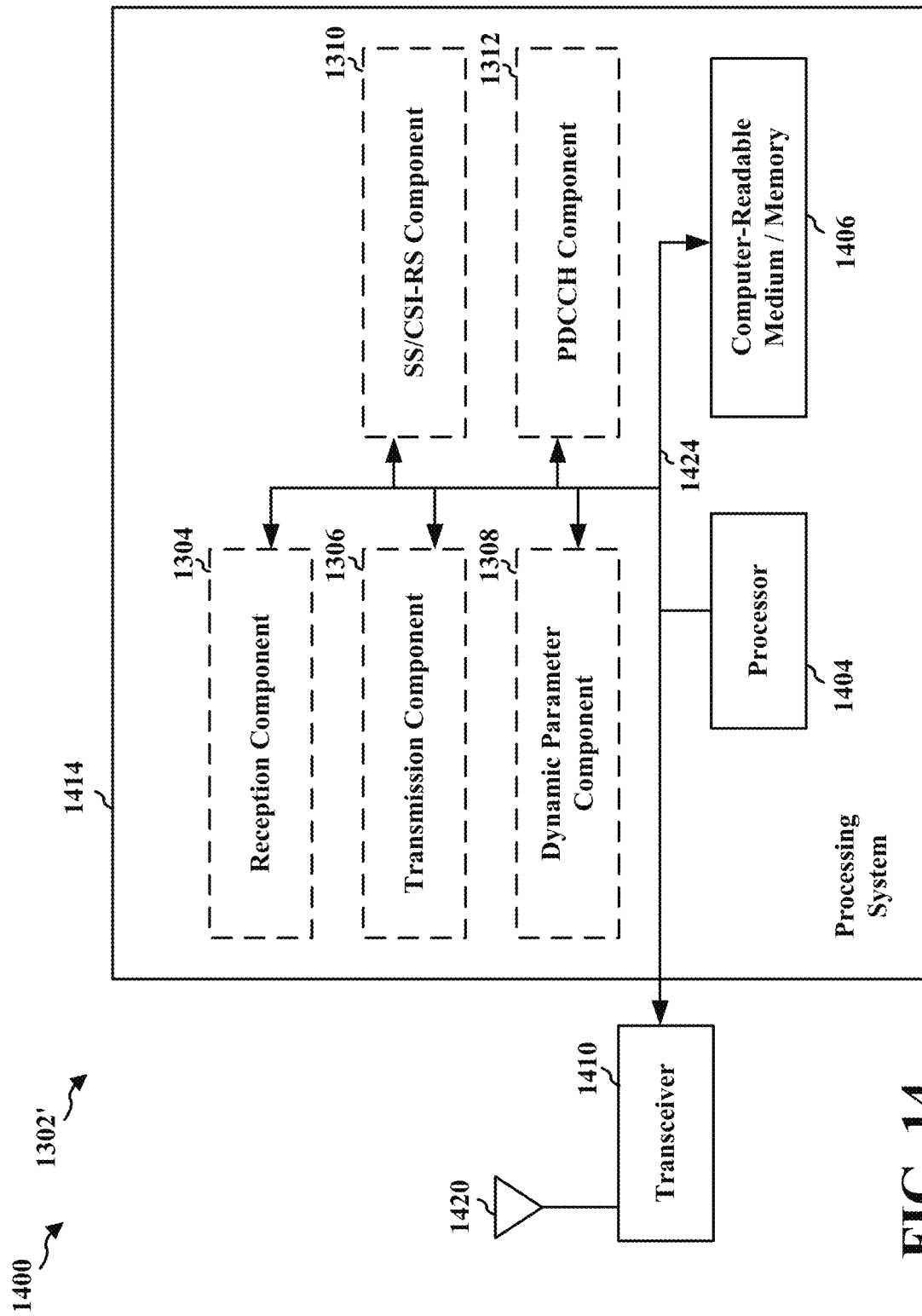
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In one configuration, the apparatus 1302/1302' for wireless communication includes means for transmitting an adjustment parameter to a UE regarding a PDCCH from the base station (e.g., 1308), means for transmitting to the UE at least one of an SS and a CSI-RS comprising a first port that is QCL with a second port of the PDCCH (e.g., 1310), wherein the adjustment parameter comprises a relationship between the PDCCH and the at least one of the SS or the CSI-RS for deriving a radio link quality, and means for transmitting a PDCCH (e.g., 1312). The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving an adjustment parameter regarding a physical downlink control channel (PDCCH) from a base station;
   receiving, from the base station, at least one of a synchronization signal (SS) or a Channel State Information Reference Signal (CSI-RS) that is quasi-co-located (QCL) with the PDCCH; and
   performing a radio link measurement based on the received at least one of the SS or the CSI-RS to identify a radio link quality using the adjustment parameter regarding the PDCCH, wherein the adjustment parameter comprises an indication between two or more thresholds, and each threshold of the two or more thresholds indicates a different block error rate.

2. The method of claim 1, wherein the adjustment parameter is received as an indication via Radio Resource Control (RRC).

3. The method of claim 1, wherein performing the radio link measurement comprises:
   performing a measurement of the at least one of the SS or the CSI-RS, wherein the radio link quality is based on a comparison of the measurement to an adjusted threshold.

4. The method of claim 3, wherein performing the radio link measurement comprises:
   comparing the measurement to the adjusted threshold to derive the radio link quality.

5. The method of claim 4
   wherein the adjusted threshold is based on the adjustment parameter regarding the PDCCH.

6. The method of claim 1, wherein the adjustment parameter comprises a relationship between a first beam width of the PDCCH and a second beam width of the at least one of the SS or the CSI-RS.

7. The method of claim 1, wherein the adjustment parameter comprises a relationship between a first transmission power of the PDCCH and a second transmission power of the at least one of the SS or the CSI-RS.

8. The method of claim 1, wherein the adjustment parameter comprises a relationship between a first traffic to pilot ratio (TPR) of the PDCCH and a second TPR of the at least one of the SS or the CSI-RS.

9. The method of claim 1, wherein the adjustment parameter comprises a relationship between a first beam orientation of the PDCCH and a second beam orientation of the at least one of the SS or the CSI-RS.

10. The method of claim 1, wherein the adjustment parameter comprises a beamforming gain difference between the PDCCH and the at least one of the SS or the CSI-RS.

11. The method of claim 1, wherein the adjustment parameter is received as at least one of a Radio Resource Control (RRC) control element, a Medium Access Control (MAC) control element, or downlink control information (DCI).

12. The method of claim 1, further comprising:
deriving the radio link quality based on the at least one of the SS or the CSI-RS using a configured threshold and the adjustment parameter; and
performing at least one of a PDCCH beam recovery or a radio link failure procedure when the derived radio link quality is below a first level.

13. An apparatus for wireless communication at a user equipment (UE), comprising:
a memory; and
at least one processor coupled to the memory and configured to:
receive an adjustment parameter regarding a physical downlink control channel (PDCCH) from a base station;
receive, from the base station, at least one of a synchronization signal (SS) or a Channel State Information Reference Signal (CSI-RS) that is quasi-co-located (QCL) with the PDCCH; and
perform a radio link measurement based on the received at least one of the SS or the CSI-RS to identify a radio link quality using the adjustment parameter regarding the PDCCH, wherein the adjustment parameter comprises an indication between two or more thresholds, and each threshold of the two or more thresholds indicates a different block error rate.

14. The apparatus of claim 13, wherein the adjustment parameter is received as an indication via Radio Resource Control (RRC).

15. The apparatus of claim 13, wherein to perform the radio link measurement, the at least one processor is configured to:
perform a measurement of the at least one of the SS or the CSI-RS, wherein the radio link quality is based on a comparison of the measurement to an adjusted threshold.

16. The apparatus of claim 15, wherein, as a part of performing the radio link measurement, the at least one processor is further configured to:
compare the measurement to the adjusted threshold to derive the radio link quality.

17. The apparatus of claim 16,
wherein the adjusted threshold is based on the adjustment parameter regarding the PDCCH.

18. The apparatus of claim 13, wherein the at least one processor is further configured to:
derive the radio link quality based on the at least one of the SS or the CSI-RS using a configured threshold and the adjustment parameter; and
perform at least one of a PDCCH beam recovery or a radio link failure procedure when the derived radio link quality is below a first level.

19. A method of wireless communication at a base station, comprising:
transmitting an adjustment parameter to a user equipment (UE) regarding a physical downlink control channel (PDCCH) from the base station; and
transmitting, to the UE, at least one of a synchronization signal (SS) or a Channel State Information Reference Signal (CSI-RS) that is quasi-co-located (QCL) with the PDCCH,
wherein the adjustment parameter comprises a relationship between the PDCCH and the at least one of the SS or the CSI-RS for identifying a radio link quality, and
wherein the adjustment parameter comprises an indication between two or more thresholds, and each threshold of the two or more thresholds indicates a different block error rate.

20. The method of claim 19, wherein the adjustment parameter is indicated via Radio Resource Control (RRC).

21. The method of claim 19, wherein the adjustment parameter is used to adjust a signal quality in deriving the radio link quality.

22. The method of claim 19, wherein the adjustment parameter is used to adjust a configured threshold based in deriving the radio link quality.

23. The method of claim 19, wherein the adjustment parameter indicates the relationship between a first beam width of the PDCCH and a second beam width of the at least one of the SS or the CSI-RS.

24. The method of claim 19, wherein the adjustment parameter indicates the relationship between a first transmission power of the PDCCH and a second transmission power of the at least one of the SS or the CSI-RS.

25. The method of claim 19, wherein the adjustment parameter indicates the relationship between a first traffic to pilot ratio (TPR) of the PDCCH and a second TPR of the at least one of the SS or the CSI-RS.

26. The method of claim 19, wherein the adjustment parameter indicates the relationship between a first beam orientation of the PDCCH and a second beam orientation of the at least one of the SS or the CSI-RS.

27. The method of claim 19, wherein the adjustment parameter comprises a beamforming gain difference between the PDCCH and the at least one of the SS or the CSI-RS.

28. The method of claim 19, wherein the adjustment parameter is transmitted as at least one of a Radio Resource Control (RRC) control element, a Medium Access Control (MAC) control element, or downlink control information (DCI).

29. An apparatus for wireless communication at a base station, comprising:
a memory; and
at least one processor coupled to the memory and configured to:

transmit an adjustment parameter to a user equipment (UE) regarding a physical downlink control channel (PDCCH) from the base station; and transmit, to the UE, at least one of a synchronization signal (SS) or a Channel State Information Reference Signal (CSI-RS) that is quasi-co-located (QCL) with the PDCCH, wherein the adjustment parameter comprises a relationship between the PDCCH and the at least one of the SS or the CSI-RS for identifying a radio link quality, and wherein the adjustment parameter comprises an indication between two or more thresholds, and each threshold of the two or more thresholds indicates a different block error rate.

30. The apparatus of claim 29, wherein the adjustment parameter is indicated via Radio Resource Control (RRC).

31. The apparatus of claim 29, wherein the adjustment parameter is used to adjust a configured threshold based in deriving the radio link quality.

\* \* \* \* \*